United States Patent
Hemmati

[19]

[11] Patent Number: 5,982,788
[45] Date of Patent: Nov. 9, 1999

[54] SEMI-MONOLITHIC CAVITY FOR EXTERNAL RESONANT FREQUENCY DOUBLING AND METHOD OF PERFORMING THE SAME

[75] Inventor: Hamid Hemmati, Encino, Calif.

[73] Assignee: California Institute of Technology, Pasadena, Calif.

[21] Appl. No.: 08/965,059

[22] Filed: Nov. 5, 1997

[51] Int. Cl.⁶ .............................. H01S 3/10; G02F 1/35
[52] U.S. Cl. .............................. 372/21; 372/22; 372/23; 372/99; 372/101; 359/326; 359/328
[58] Field of Search .................. 372/20, 21, 22, 372/23, 29, 34, 69, 70, 71, 92, 98; 359/326, 328, 330

[56] References Cited

U.S. PATENT DOCUMENTS

| | | | |
|---|---|---|---|
| 5,077,748 | 12/1991 | Kozlovsky et al. | 372/22 |
| 5,130,996 | 7/1992 | Amano et al. | 372/21 |
| 5,195,104 | 3/1993 | Geiger et al. | 372/97 |
| 5,265,110 | 11/1993 | Naya | 372/21 |
| 5,291,503 | 3/1994 | Geiger et al. | 372/21 |
| 5,321,718 | 6/1994 | Waarts et al. | 372/108 |
| 5,621,744 | 4/1997 | Kikuchi et al. | 372/12 |

*Primary Examiner*—Brian Healy
*Attorney, Agent, or Firm*—Daniel L. Dawes

[57] ABSTRACT

The fabrication of an optical cavity for use in a laser, in a frequency doubling external cavity, or any other type of nonlinear optical device, can be simplified by providing the nonlinear crystal in combination with a surrounding glass having an index of refraction substantially equal to that of the nonlinear crystal. The closed optical path in this cavity is formed in the surrounding glass and through the nonlinear crystal which lies in one of the optical segments of the light path. The light is transmitted through interfaces between the surrounding glass in the nonlinear crystal through interfaces which are formed at the Brewster-angle to minimize or eliminate reflection.

21 Claims, 4 Drawing Sheets

SEMI-MONOLITHIC CAVITY FOR EXTERNAL RESONANT FREQUENCY DOUBLING AND METHOD OF PERFORMING THE SAME

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The invention relates to optical resonators and in particular to semi-monolithic cavities for doubling the frequency of the resonant beam and to the fabrication of semi-monolithic cavities for this purpose.

2. Description of the Prior Art

Compact and efficient, continuous wave lasers with wavelength below 600 nm are generally commercially unavailable. To generate coherent radiation with wavelength below 600 nm several approaches to double the available laser frequency using second harmonic generation in a nonlinear crystal have been used. Unfortunately, the peak output power of continuous lasers is generally low for any process that requires a high electric field strength in a laser beam which is incident on a nonlinear crystal.

To enhance the second harmonic output power, one method is to place the nonlinear laser within the cavity of the laser. See, Bergqusit, H. Hemmati, and W. M. Itano, *"High power Second Harmonic Generation of 257 nm Radiation in an External Resonant Cavity,"* Optics Communication, V.43, N.6, 437–442 (1982). In this approach, the high circulating power within the cavity passes repeatedly through the crystal. Since efficiency in the nonlinear process is quadractically dependent on the input power, this approach generates substantially higher output power than a single pass through the crystal. For some lasers, such as a semiconductor lasers, intra-cavity frequency doubling is either not possible or too cumbersome to implement. Also, in the standing wave cavities, spatial hole-burning of the waves within the cavity results in multiple mode operation and could lead to strong amplitude fluctuations in the second harmonic output.

An alternative approach of the prior art is to double the fundamental frequency of the laser in a resonant external cavity. In this approach, a nonlinear crystal is located in a cavity external to the laser's own cavity. A portion of the laser's output is injected into the external cavity through a partially reflecting mirror. When the cavity is maintained on resonance with the input laser beam, constructive interference within the external cavity generates high circulating power. See, Ashkin, G. D. Boyd, and J. M. Dziedzic, *"Resonant Optical Second Harmonic generation and Mixing,"* IEEE Journal of Quantum Electronics, V. QE-1, N. 6, 109–122 (1966). Depending on the losses in the external cavity, the circulating power could be tens of times that of the input beam power. A resonantly enhanced field at the fundamental wavelength then efficiently converts to the second harmonic. For this power to be efficient, the frequencies of the laser in the external cavity must coincide. An external cavity can resonate only in a single longitudinal mode. With a multimode laser incident on the external cavity, only one mode can resonate. Thus, the power content for the remaining modes is not used. Therefore, for the most efficient process, the input laser beam has to be a single mode laser.

FIGS. 1a and 1b are simplified block diagrams that depict examples of a prior art discrete and monolithic resonant external frequency doubling cavities respectively. See, Godberg, M. K. Chun, I. N. Duling, and T. F. Carruthers, *"Blue Light Generation by Nonlinear Mixing of Nd: YAG and GaAlAs Laser Emission in a KnbO3 Resonant Cavity,"* V.56, N. 21, 2071–2073 (1990); Koziovsky, C. D. Nabors, R. L. Byer, *"Efficient Second Harmonic Generation of Diode-Laser-Pumped CW Nd:YAG Laser Using Monolithic MgO: LiNbO3 External Resonant Cavity,"* IEEE Journal of Quantum Electronics, V.24, N.6, 913–919 (1988); and Briger, H. Busener, A. Hese, F. Moers, and A. Renn, *"Enhancement of Single Frequency SHG in a Passive Ring Resonator,"* Optics Communication, V.38, #5,6, 423–426 (1981). In FIG. 1a, the laser system, generally denoted by reference numeral 10, includes a nonlinear crystal 12 between a full reflection mirror 14 and a partially reflective mirror 16. Light from a separate laser 18 is incident on a beam splitter or partially silvered mirror 20. The beam 22 splits with a portion 36 going to a piezoelectric (PZT) driven mirror 24 and the other split portion is reflected into photodetector 26. The output of photodetector 26 is coupled to and amplified by a frequency lock-in amplifier 28, whose output in turn is coupled to a servocircuit 30. The output of servocircuit 30 is coupled in turn to a summing node 32. The other input to summing node 32 is coupled to an oscillator 34 operating at the resonant frequency, f, whose output is also coupled to and drives frequency lock-in amplifier 28. The output of summing node 32 in turn is then coupled to PZT driven mirror 24. The split portion 36 of light transmitted from laser 18 through mirror 20 is incident upon PZT driven mirror 24, is optoelectromechanically phase modulated and reflected as beam 38 to mirror 14. This phase modulated light is recirculated between opposing cavity mirrors 14 and 16 through crystal 12 with transmission occurring through mirror 16 as output beam 40. By this arrangement only single mode laser light at or near the fundamental resonant frequency, f, or its harmonics are able to constructively interfere in crystal 12.

The monolithic external resonant cavity as shown in FIG. 1b similarly includes external laser 18, producing a laser beam 20 which is directed to a shaped nonlinear crystal 42. Crystal 42 has curved facets 44 and 46 at its opposing ends and a planar interlying facet 48. Beam 22 is partially reflective at facet 46 to reflect a portion of the incident beam into photodetector 50, which in turn is coupled to an electro-optical feedback control circuit 52. Control circuit 52 in turn is then coupled to crystal 42 to drive crystal 42 on resonance. A portion of beam 54 within crystal 42 is then transmitted through partially reflective facet 44 as an output beam 56. The example of the discrete mirror resonant cavity in FIG. 1a employs two or more cavity mirrors and works well and is a straightforward approach. In two mirror cavities feedback from the cavity to laser generally has a deleterious affect on the mode stability of the laser unless an isolator is placed between the laser and the cavity. Moreover, the second harmonic output is generated in two directions. This necessitates the use of at least one isolator between the laser and the resonant cavity. The addition of an isolator is undesirable due to the additional space required, the additional loss of power and its cost. If three or more mirrors are used in the cavity in a ring geometry as shown in FIG. 1b, the beam travels in one direction only and the reflective light from the input-coupler does not coincide with the incident laser beam.

In the example of the monolithic external cavity in FIG. 1b, the cavity mirrors are polished and coated directly on facets 44, 46 and 48 of crystal 42. The facets of cavity 42 form the base of the mirrors. Monolithic cavities of this type have the advantage over the discrete cavity of a lower overall intra-cavity loss, no dispersion induced mismatch, mechanical stability, good frequency stability, compactness and lower overall cost. However, monolithic cavities such as shown in FIG. 1*b* suffer from certain disadvantages relative to the discrete cavities as shown in FIG. 1*a*. These disadvantages include the susceptibility for manufacturing errors, a loss of all degrees of freedom in cavity alignment, and difficulty or cost in obtaining nonlinear crystals with an area sufficiently large in size for the implementation of specific cavity designs. In addition, changes may be required in the cavity's length to accommodate locking at different resonant frequencies, and such implementations can be difficult.

Therefore, what is needed is a design capable of frequency doubling in a manner which has the advantages of both a discrete mirror resonant cavity and monolithic external resonant cavity frequency doubling, but which is not susceptible to the disadvantages of either.

BRIEF SUMMARY OF THE INVENTION

The invention is an improvement in a nonlinear optical system having a resonant cavity. The improvement comprises a semi-monolithic resonant cavity having a first nonlinear portion and a second surrounding portion. The first nonlinear portion is characterized by a nonlinear optical response to light and the second surrounding portion is characterized by an index of refraction approximately equal to the first nonlinear portion. Light transmitted between first nonlinear portion and the second surrounding portion is transmitted through the adjacent interface surfaces of the first nonlinear portion and the second surrounding portion, which adjacent interface surfaces are defined at the Brewster-angle. As a result, ease of fabrication of the semi-monolithic cavity is facilitated.

In one embodiment the first nonlinear portion and the second nonlinear portion are in contact at the adjacent interface surfaces. In a second embodiment the adjacent interface surfaces of first nonlinear portion and the second nonlinear portion formed at the Brewster-angle are spaced apart.

The improvement further comprises a substrate to which the first nonlinear portion and the second surrounding portion of the semi-monolithic cavity are thermally coupled and physically supported. The temperature of the substrate may be controlled or at least thermally sinked.

In one embodiment the second surrounding portion is provided with at least two mirrors for providing a closed optical path. The mirrors may be formed on curved surfaces provided on the second surrounding portion, may be total internal reflection mirrors, or graded index mirrors.

In another embodiment the first nonlinear portion further comprises a nonlinear element and a pair of lenses. One of the pair of lenses is positioned at each end of the first nonlinear element. The adjacent interface surfaces at the Brewster-angle are defined between the second surrounding portion and the pair of lenses. One of the pair of lenses focuses light into the first nonlinear element and a second one of the pair of lenses collects light from the first nonlinear element for transmission from and into the second surrounding portion respectively.

The improvement may further comprise a plurality of first nonlinear portions. The second surrounding portion is arranged and configured to form a closed optical path. The closed optical path is comprised of a plurality of optical segments. Each one of the plurality of first nonlinear portions is deposed in one of the optical segments.

The semi-monolithic cavity may be employed in a laser cavity, a frequency-doubling external cavity, an optical parametric oscillator, an optical parametric amplifier, an optical parametric generator, a sum frequency mixer, or a difference frequency mixer.

The invention is also defined as an improvement in the method of fabricating a semi-monolithic cavity comprising the steps of providing a first nonlinear portion having an index or refraction; and providing a second surrounding portion having an index of a refraction approximately equal to the index or refraction of the first nonlinear portion. Interfaces are formed for transmission of light between the first nonlinear portion and the second surrounding portion. The interfaces are formed at the Brewster-angle. At least two reflective surfaces are provided in the second surrounding portion to form a closed loop of light path segments in the semi-monolithic cavity so that the reflecting surfaces may be separately adjusted when the first nonlinear portion and the second surrounding portion are assembled to form the semi-monolithic cavity.

The invention and its various embodiments having been briefly summarized can be better visualized in the following drawings where like elements are referenced by like numerals.

Figure 1A:
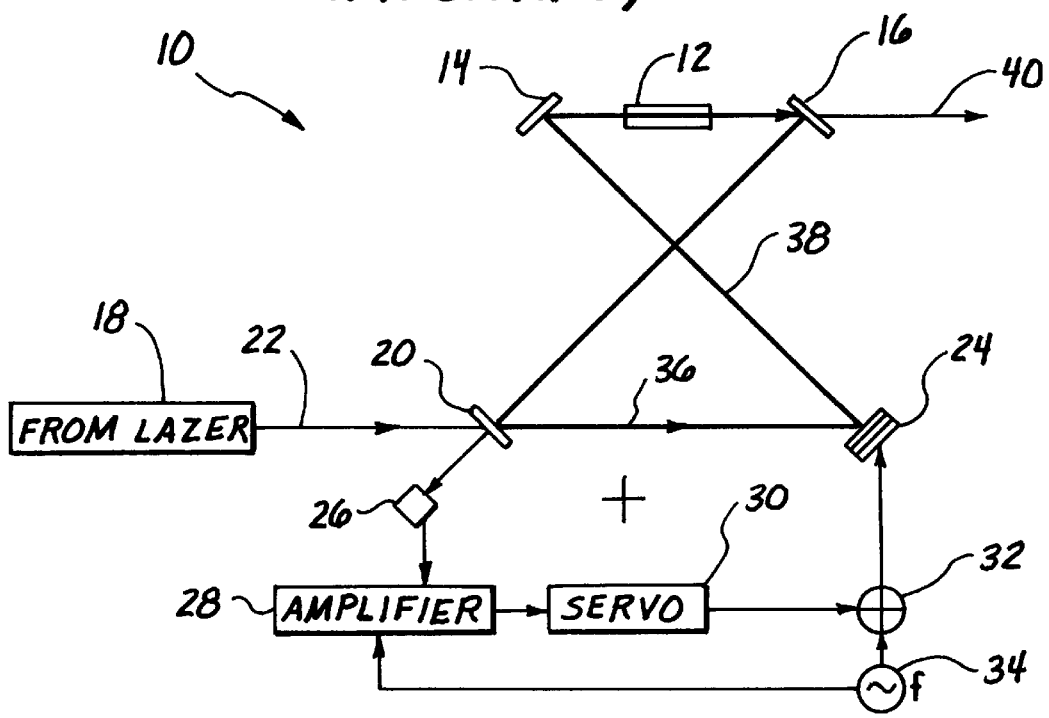
FIG. 1*a* is a block diagram of the discrete mirror external resonant cavity of the prior art.

The invention and its various embodiments now having been illustrated in the foregoing drawings, it can be better understood by turning to the following detailed description.

DETAILED DESCRIPTION OF THE PREFERRED EMBODIMENTS

The fabrication of an optical cavity for use in a laser, in a frequency doubling external cavity, or any other type of nonlinear optical device, can be simplified by providing the nonlinear crystal in combination with a surrounding glass having an index of refraction substantially equal to that of the nonlinear crystal. The closed optical path in this cavity is formed in the surrounding glass and through the nonlinear crystal which lies in one of the optical segments of the light path. The light is transmitted through interfaces between the surrounding glass in the nonlinear crystal through interfaces which are formed at the Brewster-angle or antireflection coated surfaces to minimize or eliminate reflection.

What is described below is a semi-monolithic cavity structure used for frequency doubling of lasers and of other nonlinear processes, such as optical parametric oscillators and the like which are implemented externally to the laser cavity. The invention circumvents most of the problems associated with the monolithic cavities, while maintaining the majority of advantages of monolithic cavities over discrete cavities. The semi-monolithic cavity comprises a nonlinear optic frequency doubling crystal surrounded by a shaped block of glass or other material that has a similar index of refraction as the nonlinear crystal. The cavity's mirrors, which are both curved and flat, are fabricated on the glass block rather than on the nonlinear crystal material. This approach reduces cost significantly and eliminates deleterious affects of manufacturing errors. The invention is also characterized by the fact that nonlinear interaction within the cavity occurs only along a particular axis of the crystal. With a ring monolithic cavity therefore, typically only a single arm of the ring coincides with the active crystal axis that participates in the nonlinear interaction or process.

The glass material on which the mirrors are fabricated is significantly easier to configure, polish and coat compared to nonlinear crystal materials. This fact reduces cost significantly and helps assure that the correct mirrors are applied to the external cavity and further provides a limited amount of freedom in alignment of the cavity mirrors prior to bonding. A major advantage of the semi-monolithic cavity invention is that it is free of design limitations or other considerations that arise from the limited availability of sizes of the nonlinear crystal. Although the semi-monolithic cavity contains more surfaces and therefore more loss elements within the monolithic cavity, the semi-monolithic cavity permits use of a Brewster-angled end facet as described below on the nonlinear crystal, thereby avoiding the need for an anti-reflection coating. The Brewster angle is that angle of incidence of a beam at which there is minimum reflection of the incident light, and in which the tangent of the angle is substantially equal to the common index of a fraction of the glass and the nonlinear crystal material.

Disturbance of the cavity optical path length will give rise to an error signal useful for maintaining the cavity in resonance with a laser or the laser in resonance with the cavity. Intentional cavity length displacement may be implemented in the semi-monolithic architecture in a number of alternative embodiments. For example, in one method an electric field is applied to a nonlinear material where the proper electro-optical field of the beam is accessible. In another embodiment, the laser beam is bounced off a translation mirror, such as a piezo-electric mirror, prior to entering the resonant cavity.

To maintain the cavity in resonance with the laser it will be required to dither the cavity length and use any of a number of established locking schemes to actively or passively lock the cavity in resonance with the laser. Alternatively, with some lasers such as diode lasers, it is possible to maintain the input laser beam in resonance with the cavity. Cavity length alterations are possible by adding a moving element to one of the reflecting surfaces of the cavity. Piezo-electric transducers (PZTs) are commonly used for moving a reflective surface of the cavity. Alternative approaches include application of pressure, acoustic, or an electric field to the nonlinear crystal. Conventional photo-detectors are used to detect the light transmitted from the cavity, or light reflected from the cavity and interfered with light transmitted from the cavity to ascertain fluctuations of the power circulating within the cavity. The means for generating the error signal in a semi-monolithic cavity are conventional and hence will not be further elaborated.

Figure 1B:
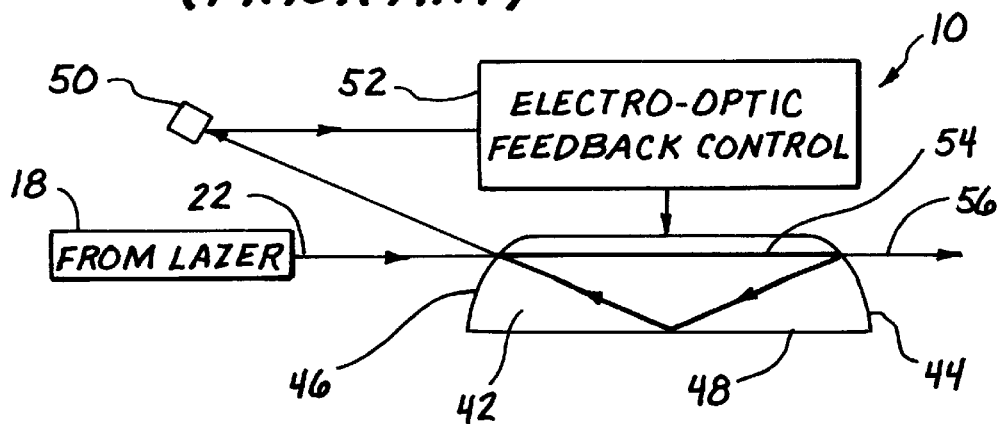
FIG. 1*b* is a block diagram of the monolithic external resonant cavity of the prior art.
Figure 2A:
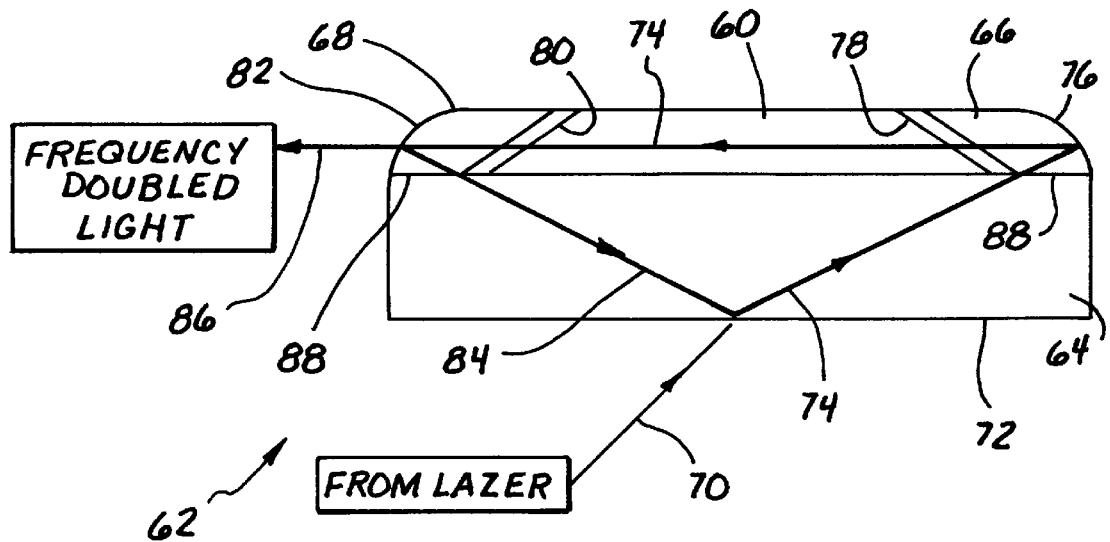
FIG. 2*a* is a semi-monolithic cavity for use in frequency doubling according to the invention.

Turn now specifically to the embodiment of the invention diagramatically shown in side cross-sectional view in FIG. 2a. FIG. 2a and the additional embodiments of FIGS. 2b, 2c, and 2d each show examples of a multi-mirror semi-monolithic cavity. Two or more mirrors may be used to implement the external cavity structure. It is to be expressly understood that although four embodiments are illustrated, the invention specifically includes any implementation consistent with the teachings of the invention regardless of the number of mirrors utilized. Also, the polished ends of the nonlinear crystal may be perpendicular to the active optical axis of the crystal or can be Brewster-angled as described below. Total internal reflection may also be used internal to the semi-monolithic cavity for the mirrors, eliminating the need for a high quality, high reflective or partially reflective mirror coatings on one or all of the surfaces. As with any laser resonant cavity, the pertinent surfaces are coated, either with a dielectric, metallic or other type of coating for maximum or partial transmission and/or reflection at the fundamental and/or second harmonic wavelengths. FIGS. 2a–2d illustrate the nonlinear crystal only in combination with the surrounding or supporting glass block. However, it must be well understood that any one of the embodiments of FIGS. 2a–2d or others within the scope of the teaching invention is or can be employed in the laser system of the type as shown in FIG. 1b to obtain a frequency doubled output. Since the elements of the laser system 10 other than crystal 60 are incidental to the scope of the invention and are shared in common among all the embodiments, only that portion of laser system 10 relating to nonlinear crystal 60 will be illustrated in FIGS. 2a–2d.

In the first embodiment of FIG. 2a the crystal assembly, generally referenced by numeral 62, is thus comprised of a nonlinear crystal 60, a glass base 64, a first corner piece 66 and a second corner piece 68. As previously stated, base 64 and corner pieces 66 and 68 are made of glass or any other material having the same or an approximately equal index of a refraction as crystal 60.

An input light beam 70 from laser 18 is incident upon mirrored surface 72 of base 64. A portion of beam 70 is transmitted through mirrored surface 72 as refracted beam 74. Refracted beam 74 propagates through base 64 into first corner piece 66 and impinges upon curved surface 76. Surface 76 is shape and coated to act as a mirrored to reflect beam 74 into crystal 60, preferably on or nearly parallel to an active axis. The interface surfaces 78 between first corner piece 66 and crystal 60 are cut or formed in corner piece 66 and crystal 60 at the Brewster-angle for crystal 60 so that light beam 74 is totally or substantially transmitted through interface 78 without substantial reflection. Similarly, at the opposing end of crystal 60 are second interface surfaces 80 also cut or formed in corner piece 68 and crystal 60 at the Brewster-angle for the same purpose.

Beam 74 continues then into second corner piece 68 and is partially transmitted through surface 82, which is provided with or formed as a partial mirror. A portion of beam 74 is then reflected as beam 84 while the remaining portion is output as a frequency-doubled output 86, which has been generated by the electro-optic feedback pumped into crystal 60 and arising from its nonlinear properties. Interfaces 88 between first and second corner pieces 66 and 68 and base 64, respectively, may be provided with an antireflection coating as is interface 90 between crystal 60 and base 64.

Thus, a comparison of FIG. 2*a* to FIG. 1*b* illustrates that nonlinear crystal 42 of FIG. 1*b* has been replaced by the crystal assembly 62 of FIG. 2*a*, which is formed of a bonded composite assembled from nonlinear crystal 60 with glass elements 64, 66 and 68 to provide the same or similar optical performance. The difference is that optical assembly 62 may now be more freely designed, since glass pieces 64, 66 and 68 can be readily manufactured, aligned, changed and fabricated to achieve the operational parameters desired in any given case than would otherwise be achieved if the entire assembly 62 had to be manufactured from a single nonlinear crystal material.

Figure 2B:
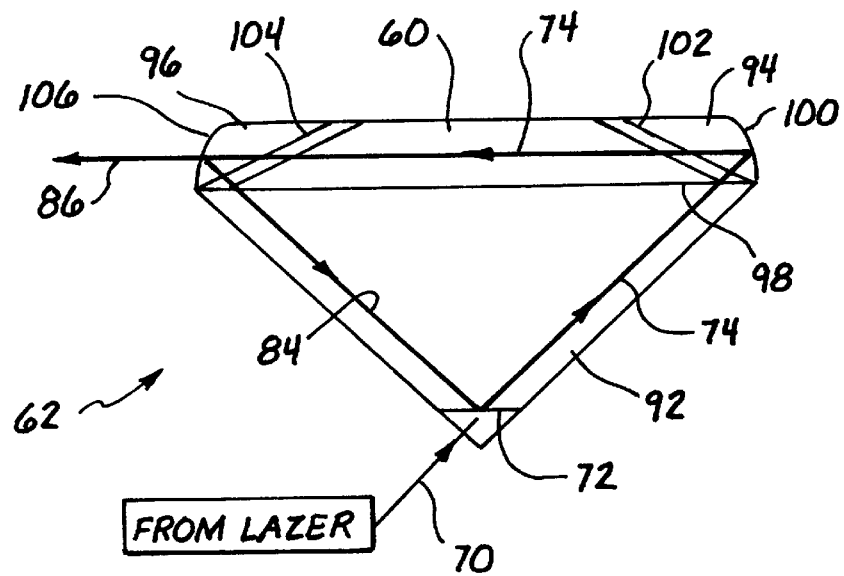
FIG. 2*b* is another embodiment of a semi-monolithic cavity, where Brewster-angle faces circumvent the need for anti-reflection coatings for those surfaces through which the beam is transmitted.

FIG. 2*b* depicts a second embodiment of the invention wherein semi-monolithic cavity 62 is triangular in shape and is comprised of a shaped or faceted triangular base 92 combined with a first end piece 94, nonlinear crystal 60 and a second end piece 96. Laser beam 70 is once again incident upon a partially reflective surface 72 and is refracted to form beam 74. Beam 74 then passes through a pair of interface surfaces 98 cut or formed at the Brewster angle between base 92 and first corner piece 94. Again, interface 98 may be coated with anti-reflective material. As before, curved surface 100 of corner piece 94 is provided with a fully reflective mirror so that beam 74 is directed into crystal 60 along an optically active axis. The pair of Interface surfaces 102 between corner piece 94 and crystal 60 are as before cut or formed at the Brewster-angle for crystal 60 as are the opposing interface surfaces 104 at the opposing end of crystal 60. Beam 74 is therefore transmitted through interface 104 to second corner piece 96 wherein it impinges upon curved surface 106, which is provided with a partial mirrored coating. Reflecting beam 84 is then returned to surface 72 to be recirculated. The remaining portion of beam 74 is transmitted through surface 106 as output beam 86.

Figure 2C:
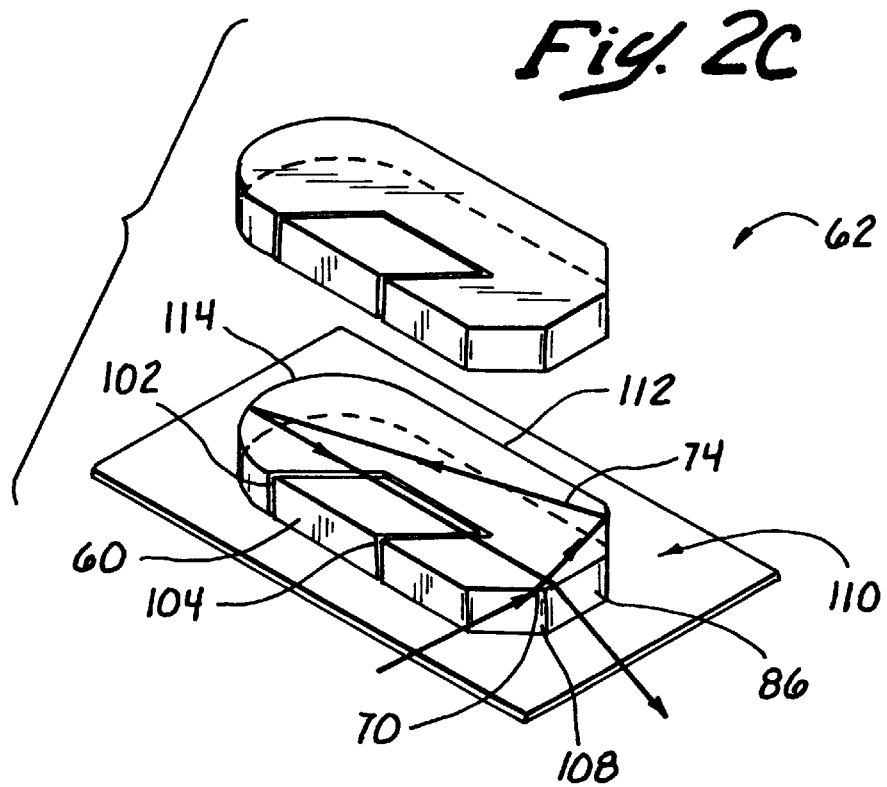
FIG. 2*c* is a third embodiment of the semi-monolithic external cavity used as a frequency doubler.
Figure 3:
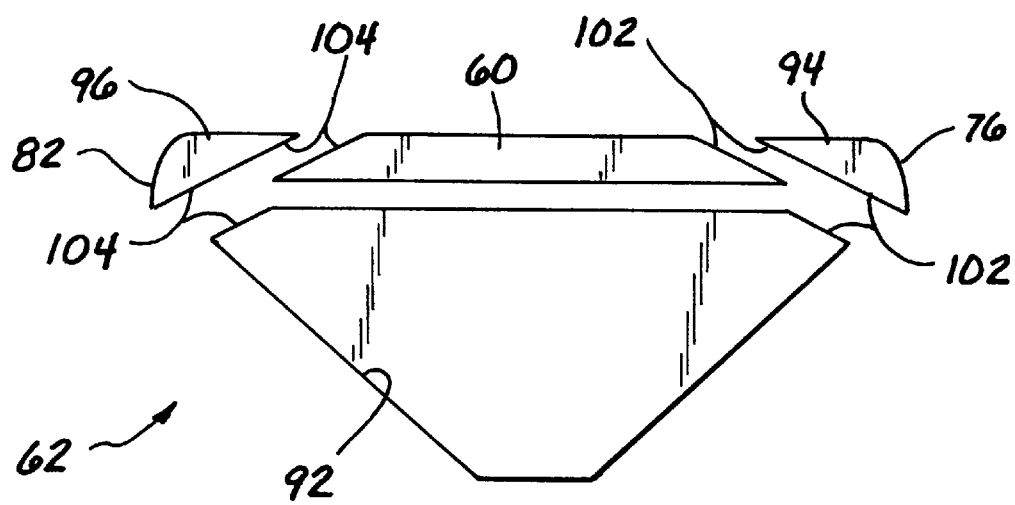
FIG. 3 is a diagrammatic view of a semi-monolithic cavity of the invention prior to its assembly.

Semi-monolithic cavity 62 shown in disassembled form prior to bonding in assembly for the embodiment FIG. 2*b* is illustrated in side cross-sectional view in FIG. 3. Interface surfaces 102 and 104 through which inter-cavity beam 74 transverses are made or cut at the Brewster-angle and an anti-reflection coating may optionally be provided to minimize reflection losses. Interface surfaces 102 and 104 may come into contact with each other or a small gap may be left between them. Nonlinear crystal 60 may be bonded optically or with a bonding material to grasp block 92, 94 and 96. Elements, 92, 94, 96 and 60, may be severally or each bonded by adhesive, solder or other known or later discovered bonding methods to a flat, low thermal expansion surface or substrate 113, diagrammatically shown in FIG. 2*c*. This substrate surface may be part of a thermoelectric cooler or other temperature controlled element to provide temperature control of nonlinear crystal 60 and surrounding optic elements 92, 94 and 96.

Turn now to the third embodiment FIG. 2*c*, which illustrates in perspective view, semi-monolithic cavity 62. In this embodiment, laser beam 70 is incident upon a partially mirrored surface with 108. Refracted beam 84 then impinges upon a mirrored surface 110. Surfaces 108 and 110 are defined on an integral glass block 112. Reflected beam 74 then impinges upon a curved mirrored surface 114 also defined on integral block 112. The beam is then reflected from curved mirrored surface 114 along an active optical axis of crystal 60 through interfaces 102 and 104 cut or formed at the Brewster-angle as before. The beam then internally impinges upon surface 108 and is partially reflected to recirculate within cavity 62 and partially transmitted as output beam 86.

Figure 2D:
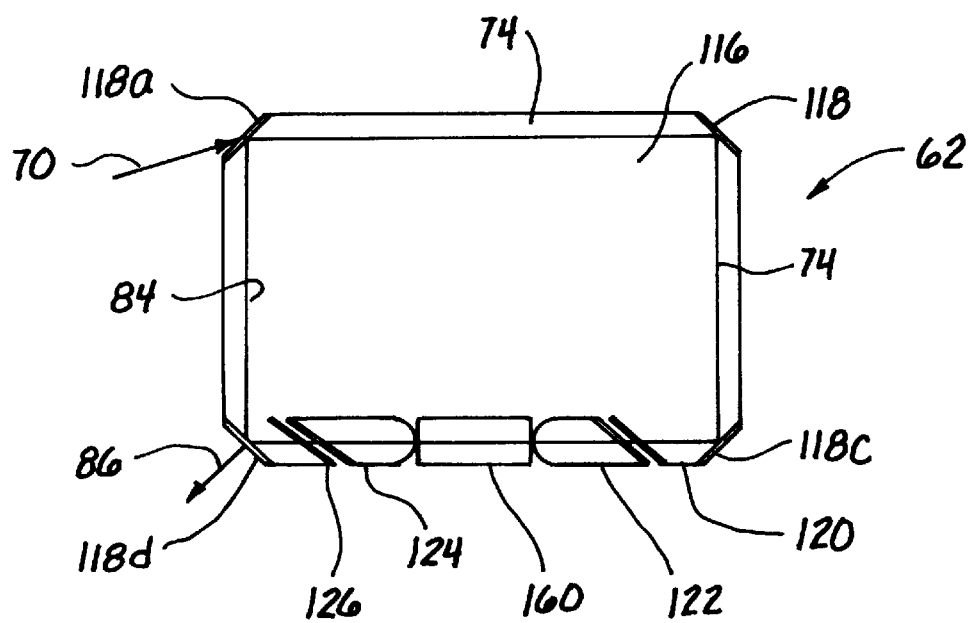
FIG. 2*d* is a fourth embodiment to the semi-monolithic cavity of the invention, wherein internal lenses are used to focus into a flat/flat nonlinear crystal rather than using mirrors, i.e. the interface surfaces at the crystal are flat surfaces. One or all the cavity mirrors are total internal reflection type mirrors.

A fourth embodiment is shown in a cross-sectional view of FIG. 2*d* in which semi-monolithic cavity 52 is formed using a generally rectangular glass body 116 having corner cavity faceted mirrors 118*a*–*d* which are total internal reflection type mirrors. In this case, laser beam 70, such as a from a diode laser is incident upon one of the facet corners 118*a* to form refracted beam 74. Beam 74 propagates through body 116 to the opposing internal reflection mirror 118*b*, which reflects beam 74 to a third total internal reflection mirror 118*c*. The beam in turn is reflected from facet corner 118*c* through an interface 120 cut at the Brewster-angle and into a focusing lens 122. The light is focused by lens 122 into nonlinear crystal 60 and then collected at the imposing end of crystal 60 by lens 124. Focused beam 74 then propagates through a second interface 126 again cut or formed at the Brewster-angle back into body 116 to impinge upon the fourth facet corner 118*d*. The beam is partially reflected and partially transmitted through facet corner 118*d* to form output beam 62 and recirculated reflective beam 84.

Table 1 below lists illustrative examples of materials which may be used for nonlinear crystal 60 for second harmonic generation or for optical parametric oscillation in combination with various types of glasses or other easily polishable materials that have an index of refraction similar to the nonlinear material. The listed materials may be used in any one or all of the described embodiments. The glass block or cavity must be selected so that it is highly transparent at both the fundamental and the second harmonic wavelengths.

TABLE 1

| Nonlinear crystal material | approx. value of index of refraction | glass or other material | approx. value of the index of refraction |
|---|---|---|---|
| lithium borate (LBO) | 1.56 | BK7 | 1.51 |
|  |  | fused silica | 1.45 |
| beta barium borate (BBO) | 1.65 | SSK glass | 1.65 |
| potassium titanyle phosphate (KTP) | 1.75 | sapphire | 1.75 |
|  |  | SF11 glass | 1.75 |
| potassium titanyle arvenate (KTA) | 1.79 | sapphire | 1.75 |
|  |  | CsI | 1.75 |
| lithium iodine trioxide (LiIO$_3$) | 1.87 | YAG | 1.82 |

Returning to the embodiment of FIG. 3, the two individual mirrors formed on corner pieces 94 and 96 allow fine tuning of the reflection angle of the mirrors before they are firmly secured, bonded or affixed in place. In a monolithic cavity, if any error occurs in the fabrication of the curved surfaces of this portion of the cavity, such as failure to exactly co-align the apex of the curved surfaces, the entire cavity piece has to be discarded or completely reworked. In the semi-monolithic cavity 62 of the invention, minor corrections are possible since curved surfaces 76 and 82 may be separated and formed on glass and materials that are easily worked, polished and coated.

Alternatively, in the embodiment of FIG. 2*c*, curved mirror 114 is part of the integral glass block 112. Fabrication of glass block 112 that forms the principal part of semi-monolithic cavity 62 can be formed by a significantly more reliable and simpler procedure and is therefore less expensive than attempting to fabricate the entire structure 62 out of exotic nonlinear crystals.

In the discrete mirror cavity as shown in FIGS. 1*a* and *b* provided with Brewster-angled surfaces on the nonlinear crystal, optical aberrations such as coma and astigmatism, occur when the curved cavity mirrors focus the intracavity beam 74 into crystal 60. Semi-monolithic cavity 62 is immune from this problem since the adjacent pair of facets on both the glass block or corner pieces and nonlinear crystal 60 are also at the Brewster's angle. Also, there is no significant change in the index of refraction when the intracavity beam enters or exits nonlinear crystal 60.

Another alternative to using curved surfaces on the glass block that surround nonlinear crystal 60 is to use mirrors made from graded index rods as described by J. C. Vandrleeden *"Resonant Cavities with Mirrors Made From Graded Index Rods"* Journal of Applied Physics, Vol. 45, No. 1, 201–208, (January 1974) incorporated herein by reference, where it is shown that optical cavities can be made with gradient index (GRIN) rod lenses. Such a lens has an index of refraction that is not uniform from one surface to the next, rather, it varies gradually. The spherical mirrors for the cavity are made by putting a high-reflectance dielectric coating on one of the flat ends of a GRIN rod segment. It is shown that one or two GRIN mirrors can be used to make all the usual resonator configurations. For example, two GRIN mirrors attached to a solid-state dielectric laser rod can be substituted for curved mirrors ground on the rod ends; the ends need only be reasonably flat.

In this specification, the GRIN mirrors are attached to or slightly spaced away from the nonlinear crystal to forming a resonant external cavity. The graded index materials are constructed with flat/flat surfaces but coated on one side to act as a mirror. Such mirrors may replace the curved individual mirrors described above, thereby avoiding the need for fabrication of any curved surfaces. The graded index mirror does introduce a small amount of optical aberration. The aberrations would have to be considered when designing any particular system.

The second harmonic output may be extracted from cavity 62, either through one of the cavity mirrors or through a dichroic beam-splitter that is placed immediately after nonlinear crystal 60. The dichroic beam-splitter efficiently transmits the fundamental wavelength and efficiently reflects the second-harmonic beam. Each technique for beam extraction has its advantages and disadvantages. Extraction of the second harmonic beam through one of the cavity mirrors is the generally practiced technique. However, if a dichroic beam-splitter with very high throughput at the fundamental frequency was available, it would result in a higher overall efficiency for the nonlinear conversion process. Both beam extraction methods are usable in semi-monolithic cavity 62.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, semi-monolithic cavity 72 as described above can be used in virtually any resonant optical or infrared cavity. In addition to frequency-doubling, the invention may be applied to all nonlinear optical processes and devices such as an optical parametric oscillators, optical parametric amplifiers, optical parametric generators, sum frequency mixing, difference frequency mixing and laser cavities. Thus, in addition to frequency-doubling, the technology described above may be applied to all optical cavities that utilize a solid or liquid phase medium.

Figure 4:
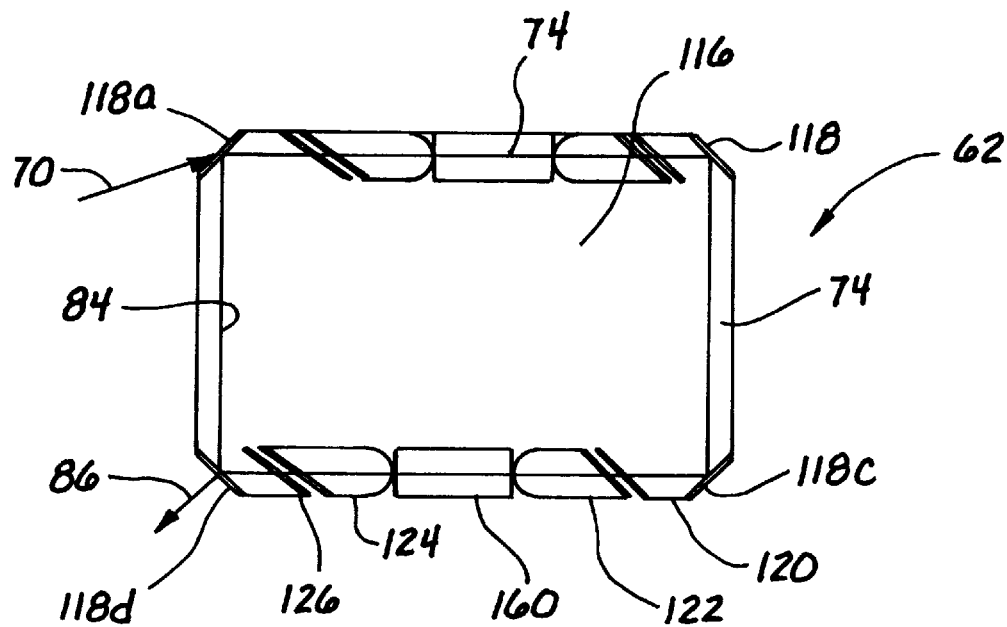
FIG. 4 is a simplified cross-sectional view of the semi-monolithic cavity of the invention where a plurality of nonlinear crystals are used.

Although the foregoing embodiments have shown only a single nonlinear crystal in semi-monolithic cavity 62, it is to be expressly understood that two or more nonlinear crystals my be employed with one in each arm of the cavity as shown in FIG. 4. Both electro-optical and thermal tuning of cavity 62 may be applied either to nonlinear crystal 60 or to the matching optical materials surrounding nonlinear crystal 60.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in a nonlinear optical system having a resonant cavity comprising a semi-monolithic resonant cavity having a first nonlinear portion and a second linear surrounding portion, said first nonlinear portion characterized by a nonlinear optical response to light and said second linear surrounding portion characterized by an index of refraction approximately equal to said first nonlinear portion, light transmitted between first nonlinear portion and said second linear surrounding portion being transmitted through adjacent interface surfaces of said first nonlinear portion and said second linear surrounding portion which adjacent interface surfaces are substantially nonreflective.

2. The improvement of claim 1 where said first nonlinear portion and said second linear portion are in contact at said adjacent interface surfaces thereof formed at the Brewster-angle.

3. The improvement of claim 1 wherein said adjacent interface surfaces of first nonlinear portion and said second linear portion formed at the Brewster-angle are spaced apart.

4. The improvement of claim 1 wherein at least one of said adjacent interface surfaces in contact are provided with an anti-reflection coating.

5. The improvement of claim 1 wherein at least one of said adjacent interface surfaces spaced apart from each other is provided with an anti-reflective coating.

6. The improvement of claim 1 further comprising a substrate to which said first nonlinear portion and said second linear surrounding portion of said semi-monolithic cavity are thermally coupled and physically supported.

7. The improvement of claim 6 wherein temperature of said substrate is controlled.

8. The improvement of claim 1 wherein said second linear surrounding portion is provided with at least two mirrors for providing a closed optical path.

9. The improvement of claim 8 wherein said mirrors are formed on curved surfaces provided on said second linear surrounding portion.

10. The improvement of claim 8 wherein said mirrors are total internal reflection mirrors.

11. The improvement of claim 1 wherein first nonlinear portion further comprises a nonlinear element and a pair of lenses, one of said pair of lenses be positioned at each end of said first nonlinear element, said adjacent interface surfaces at the Brewster-angle defined between said second linear surrounding portion and said pair of lenses, one of said pair of lenses for focusing light into said first nonlinear element and a second one of said pair of lenses for collecting light from said first nonlinear element for transmission from and into said second linear surrounding portion respectively.

12. The improvement of claim 1 further comprising a plurality of first nonlinear portions, said second linear surrounding portion arranged and configured to form a closed optical path, said closed optical path comprised of a plurality of optical segments, each one of said plurality of first nonlinear portions being deposed in one of said optical segments.

13. The improvement of claim 8 wherein said mirrors are graded index mirrors.

14. The improvement of claim 1 wherein said semi-monolithic cavity comprises a laser cavity.

15. The improvement of claim 1 wherein said semi-monolithic cavity comprises a frequency-doubling external cavity.

16. The improvement of claim 1 wherein said semi-monolithic cavity comprises a cavity in an optical parametric oscillator.

17. The improvement of claim 1 wherein said semi-monolithic cavity comprises a cavity in an optical parametric amplifier.

18. The improvement of claim 1 wherein said semi-monolithic cavity comprises a cavity in an optical parametric generator.

19. The improvement of claim 1 wherein said semi-monolithic cavity comprises a cavity in a sum frequency mixer.

20. The improvement of claim 1 wherein said semi-monolithic cavity comprises a cavity in a difference frequency mixer.

21. An improvement in the method of fabricating a semi-monolithic cavity comprising:

provding a first nonlinear portion having an index or refraction;

providing a second linear surrounding portion having an index of a fraction approximately equal to said index of refraction of said first nonlinear portion;

forming interfaces for transmission of light between said first nonlinear portion and said second linear surrounding portion, wherein said interfaces are formed at the Brewster-angle; and providing at least two reflective surfaces in said second linear surrounding portion to form a closed loop of light path segments in said semi-monolithic cavity so that said reflecting surfaces may be separately adjusted when said first nonlinear portion and said second linear surrounding portion are assembled to form said semi-monolithic cavity.

* * * * *